US009123147B2

(12) United States Patent
Barneoud et al.

(10) Patent No.: US 9,123,147 B2
(45) Date of Patent: Sep. 1, 2015

(54) IMAGING APPARATUS FOR DISPLAY OF MAXILLARY AND MANDIBULAR ARCHES (71) Applicant: TROPHY, Rochester, NY (US)

(72) Inventors: Julien D. Barneoud, Bussy Saint Martin (FR); Sabrina Capron-Richard, Marne la Vallee (FR); Sylvie Bothorel, Paris (FR); Ronan Etesse, Marne la Vallee (FR)

(73) Assignee: Carestream Health, Inc., Rochester, NY (US)

( * ) Notice: Subject to any disclaimer, the term of this patent is extended or adjusted under 35 U.S.C. 154(b) by 85 days.

(21) Appl. No.: 13/742,385

(22) Filed: Jan. 16, 2013

(65) Prior Publication Data

US 2014/0071126 A1 Mar. 13, 2014

Related U.S. Application Data (60) Provisional application No. 61/698,048, filed on Sep. 7, 2012.

(51) Int. Cl.
*G06T 17/00* (2006.01)
*G06T 19/00* (2011.01)

(52) U.S. Cl.
CPC .............. *G06T 17/00* (2013.01); *G06T 19/00* (2013.01); *G06T 2210/41* (2013.01); *G06T 2219/008* (2013.01)

(58) Field of Classification Search
CPC ..... G06T 17/00; G06T 19/00; G06T 2210/41; G06T 2219/008
See application file for complete search history.

(56) References Cited

U.S. PATENT DOCUMENTS

| 1,293,567 | A | 2/1919 | Stanton |
| 6,334,853 | B1 | 1/2002 | Kopelman et al. |
| 6,726,478 | B1 | 4/2004 | Isiderio et al. |
| 7,123,767 | B2 | 10/2006 | Jones et al. |
| 7,140,877 | B2 | 11/2006 | Kaza |
| 7,347,690 | B2 | 3/2008 | Jordan et al. |
| 7,433,810 | B2 * | 10/2008 | Pavloskaia et al. ............... 703/6 |
| 8,021,147 | B2 | 9/2011 | Sporbert et al. |
| 2007/0141526 | A1 * | 6/2007 | Eisenberg et al. ............... 433/24 |
| 2009/0098502 | A1 | 4/2009 | Andreiko |
| 2010/0151404 | A1 | 6/2010 | Wu et al. |
| 2011/0247214 | A1 | 10/2011 | Huge |
| 2011/0255765 | A1 * | 10/2011 | Carlson et al. ................. 382/131 |
| 2012/0032981 | A1 * | 2/2012 | Hackwell ...................... 345/650 |

OTHER PUBLICATIONS

Chanjira Sinthanayothin, et al., "Mesh Cutting For Aided 3D Digital Model Setup and Planning," Proceedings of the Tenth IASTED International Conference Computer Graphics and Imaging, 2008, pp. 83-87.

* cited by examiner

*Primary Examiner* — Kee M Tung
*Assistant Examiner* — Frank Chen (57) ABSTRACT

A method for displaying teeth of a patient, generates a three-dimensional model of the patient's teeth and displays the generated three-dimensional model. A displayed image shows a cross-sectional view of the teeth according to the position of a cutting plane extending through the three-dimensional model. The relative position of the cutting plane is adjustable according to an operator instruction. The orientation of the displayed cross-sectional view is determined by the position of the cutting plane.

20 Claims, 10 Drawing Sheets

IMAGING APPARATUS FOR DISPLAY OF MAXILLARY AND MANDIBULAR ARCHES

CROSS REFERENCE TO RELATED APPLICATIONS

This application claims priority to Provisional U.S. Patent Application Ser. No. 61/698,048, filed Sep. 7, 2012 in the names of Julien D. Barneoud, et al., entitled IMAGING APPARATUS FOR DISPLAY OF MAXILLARY AND MANDIBULAR ARCHES, incorporated herein by reference in its entirety.

FIELD OF THE INVENTION

The invention relates generally to the field of dental imaging and more particularly to apparatus and methods for visualizing maxillary and mandibular arches and occlusion.

BACKGROUND OF THE INVENTION

Orthodontic treatment is widely applied for repositioning teeth and supporting structures to improve tooth function and aesthetics. In conventional orthodontic treatment, appliances such as braces are applied to the patient's teeth by an orthodontist. Over time, the continuing force exerted by the appliance can urge teeth toward more favorable positions, often providing movement to the teeth in incremental steps with successive treatments.

Aspects of tooth function that are studied as part of orthodontics and other restorative treatments include proper occlusion, so that teeth in the upper jaw work successfully with corresponding teeth in the lower jaw. Occlusion determines how opposing teeth are positioned relative to each other, come into contact, and interact with each other in normal movement.

To define a dental treatment such as orthodontics or a restorative treatment in conventional practice, dentists typically manipulate one or more casts obtained from a patient's dental arches. One conventional method forms an occlusogram that displays the intersection between opposite teeth, using translucent papers, for example, as described in U.S. Pat. No. 1,293,567 to Stanton. Using the cast, the projection of the teeth of the lower dental arch on an axial (horizontal) plane is reproduced on a first translucent paper. The projection of the teeth of the upper dental arch is reproduced on a second translucent paper. Both papers are then superimposed, providing a representation of the occlusal conditions. By dragging one of the translucent papers relative to the other, a representation of new occlusal conditions is obtained.

With the advent of digital imaging, there have been a number of solutions proposed for representing and displaying dental occlusion obtained from captured image data. Information for mapping, measurement, and analysis of occlusion conditions can be digitally obtained and processed to help support the orthodontist or other dental specialist in correcting problems and in providing the best arrangement of tooth structures for this purpose. Unfortunately, methods for display of maxillary (upper jaw) and mandibular (lower jaw) arch structures require the dental practitioner to analyze the information in one view, then to attend to the patient to address the positioning problem from a different view. In conventional displays of arch structures, for example, the incisors in either the maxillary or mandibular jaw have been displayed in one standard orientation only, requiring the practitioner to mentally provide the spatial transform that is needed to invert this visual information in order to suit the orientation of the mouth of the patient. It can be appreciated that there is a need for tools that enable the dental practitioner to change the orientation of a display for occlusion according to a selection that shows the area of interest.

SUMMARY OF THE INVENTION

An object of the present invention is to advance the art of dental imaging, with particular interest in imaging and visualization tools for viewing dental arches and related structures and positional relationships. Embodiments of the present invention particularly address the need for improved methods for display of structures of the dental arches that visualize occlusion. Advantageously, embodiments of the present invention present visual information to the practitioner that is representative of the actual perspective the practitioner has with viewing a corresponding structure in the patient's mouth. The display can be modified by the practitioner using a straightforward mechanism that shows cross-sectional information and displays this information at an orientation that is suited to the perspective of the practitioner relative to the mouth of the patient.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for displaying teeth of a patient, the method comprising: generating a three-dimensional model of the patient's teeth; displaying the generated three-dimensional model; displaying an image showing a cross-sectional view of the teeth according to the position of a cutting plane extending through the three-dimensional model; and adjusting the relative position of the cutting plane according to an operator instruction, wherein the orientation of the displayed cross-sectional view is determined by the position of the cutting plane.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

This application claims priority to Provisional U.S. Patent Application Ser. No. 61/698,048, filed Sep. 7, 2012 in the names of Julien D. Barneoud, et al., entitled IMAGING APPARATUS FOR DISPLAY OF MAXILLARY AND MANDIBULAR ARCHES, which is incorporated by reference in its entirety.

The following is a detailed description of the preferred embodiments of the invention, reference being made to the drawings in which the same reference numerals identify the same elements of structure in each of the several figures.

In the context of the present invention, the term "predominant" has its standard meaning, that is, where there are two variable values or characteristics, the predominant value or characteristic is the more common or more dominant of the two.

In the context of the present disclosure, the terms "viewer", "operator", and "user" are considered to be equivalent and refer to the viewing practitioner or other person who views and manipulates an image, such as a dental image, on a display monitor. A "viewer instruction" can be obtained from explicit commands entered by the viewer, such as using a computer mouse or keyboard entry.

The term "highlighting" for a displayed feature has its conventional meaning as is understood to those skilled in the information and image display arts. In general, highlighting uses some form of localized display enhancement to attract the attention of the viewer. Highlighting a portion of an image, such as a set of teeth from the upper or lower jaw, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

In the context of the present disclosure, the term "image" refers to multi-dimensional image data that is composed of discrete image elements. For 2-D (two-dimensional) images, the discrete image elements are picture elements, or pixels. For 3-D (three-dimensional) images, the discrete image elements are volume image elements, or voxels.

Spatially relative terms, such as "beneath", "below", "lower", "above", "upper", "vertical", "horizontal", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Figure 1A:
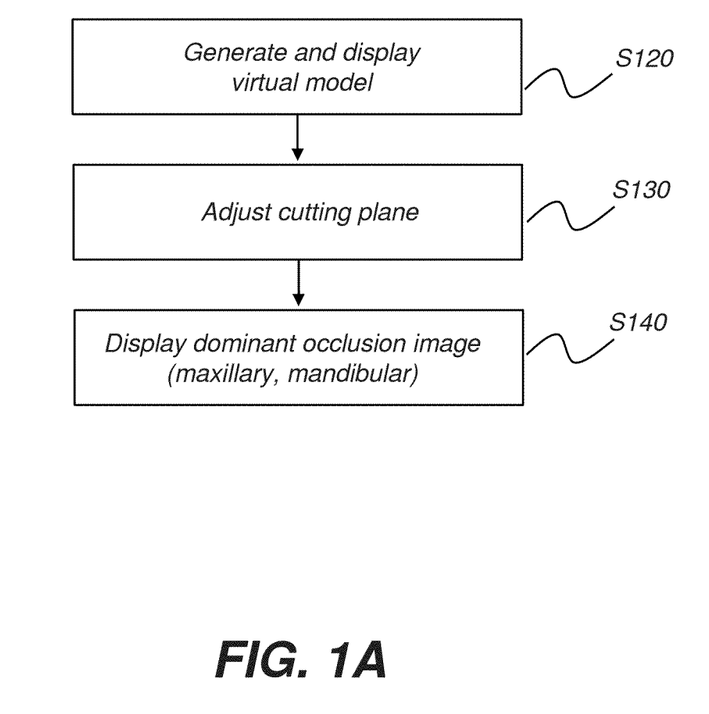
FIG. 1A is a logic flow diagram that shows the sequence of steps for display of an image showing occlusion.

Embodiments of the present invention address the need for providing information in a form that is useful for examining the arrangement of structures of the dental arches for displaying each dental arch in a useful orientation for the practitioner. The logic flow diagram of FIG. 1A shows a general sequence of steps that are used for obtaining and displaying the appropriate data. These steps begin with a model generation step S120. The logic flow diagram of FIG. 1B lists a sequence for step 120 used to generate a virtual model where a cast or impression is used.

Figure 1B:
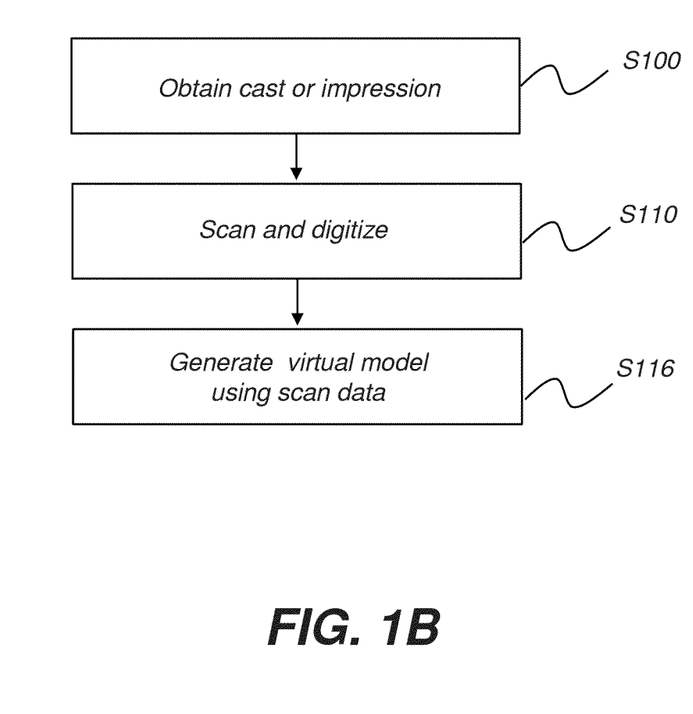
FIG. 1B is a logic flow diagram that shows a sequence of steps for generating a virtual model.

Using the sequence of FIG. 1B, in a preparation step S100, the dental staff obtains one or more impressions from the mouth of the patient and generates a cast using the impression. Once casts or impressions have been obtained, they are scanned and digitized in a digitization step S110, using image scanning and reconstruction techniques well known in the 3-dimensional (3-D) imaging arts. A virtual model generation step S116 then generates the virtual model of dental arch structures using the scanned data.

Figure 1C:
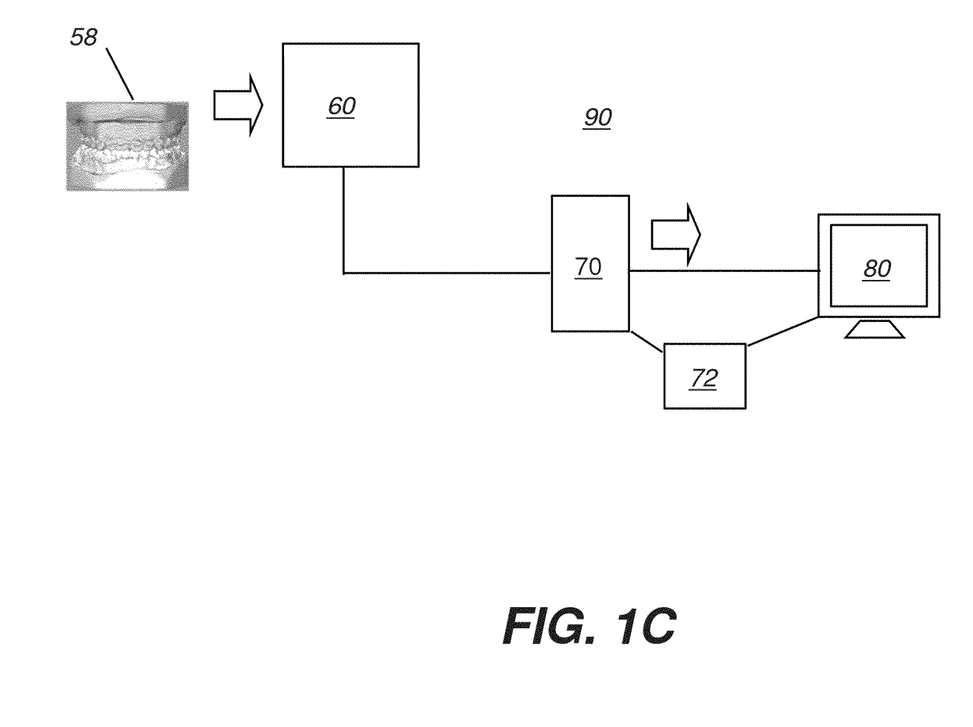
FIG. 1C is a schematic block diagram of a system for generation and display of a virtual model according to an embodiment of the present invention.
Figure 2:
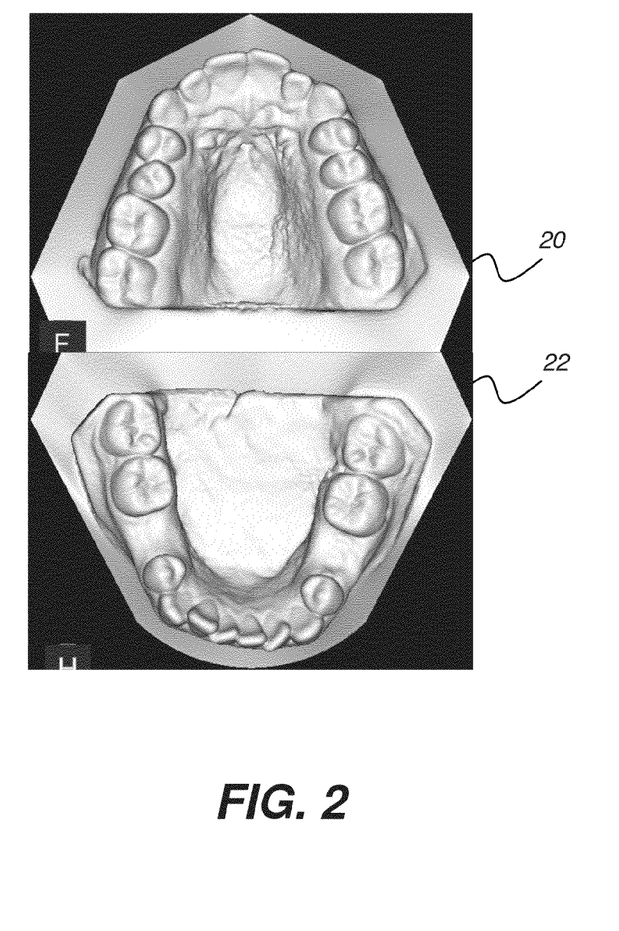
FIG. 2 is a perspective view showing virtual models of maxillary and mandibular arches.

The schematic block diagram of FIG. 1C shows a system 90 for generation and display of a virtual model according to an embodiment of the present invention. A cast or impression 58 is formed from the patient. Reconstruction of the virtual model can use data from a scan, such as from an x-ray scan of the cast or impression, using the method of FIG. 1B. An optical scanner 60 is configured to obtain data that can be used for virtual model generation. Optical scanner 60 can use an image capture apparatus, such as a camera to scan the impression of the patient's teeth and other mouth structures with visible light or other non-ionizing light source. Other imaging apparatus, such as an x-ray device or intraoral imaging camera, for example, can alternately be used as scanner 60 for obtaining the data needed for virtual model generation. For image generation and display, scanner data goes to a computer 70 that is in signal communication with scanner 60 and is configured to perform the needed image processing and reconstruction of the virtual model. A display 80, in signal communication with computer 70, is then used to show processing results and to allow interaction with the operator. An operator interface 72 is provided, which may use a touch screen interface on display 80 or other operator instruction entry tools. Computer 70 and display 80 can be part of an integrated scanning system with scanner 60 or can be networked devices, such as those provided by a general-purpose computer having appropriate software, for example. According to an alternate embodiment of the present invention, computer 70 is a dedicated, networked device that is used to acquire and process the scanned data. The scanned results are then transmitted over the network to another computer for the more computer-intensive task of volume image reconstruction. An alternate computer system can also be used for storage and display functions. The various functions of data acquisition, image reconstruction, and display are typically executed according to software instructions stored on any of a number of computers associated with the imaging apparatus. It can be appreciated that the configuration represented in FIG. 1C is generalized and that the image acquisition and processing functions used in providing the displayed image can be implemented in any of a number of ways, such as with an integrated or a distributed system. FIG. 2 shows representative virtual dental arches 20 and 22 formed and used as part of this process, using and processing impressions from a patient.

Once the data for the virtual model is obtained, whether using a scanned cast or impression or using a scan of the patient's mouth or x-ray data obtained by scanning a cast or impression from the patient's mouth, the next step is generation and display of a virtual model in model generation step S120, as shown in FIG. 1A. The reconstruction of a virtual model is well known in the dental imaging arts. For example, U.S. Pat. No. 6,334,853 to Kopelman et al. discloses how to obtain virtual dental models from a plaster model that was obtained by casting a negative alginate impression. An occlusion map can then be generated from the virtual dental model using the described technique. As another example, U.S. Pat. No. 7,140,877 to Kaza discloses how to obtain a positive digital model directly from a negative deformable alginate impression by x-ray scanning of the impression.

Of interest of the reconstruction of both the upper and the lower virtual arches is the capability to register or align both arches to reproduce the occlusal relationship for the patient. U.S. Pat. No. 7,347,690 to Jordan et al. discloses a computer-implemented method for aligning the upper and the lower three dimensional virtual dental arches. Execution of this method necessitates some additional data, namely data related to contact points and overall bite alignment. These data can be obtained, for example, by having the patient bite a wax plate that is then scanned and digitized. Automatic alignment of the relative position for both arches is then performed using the bite data.

These methods work well for many purposes, but often fall short of what is needed to provide full 3-D visualizations for assessment of dental arch alignment. Instead, cross-sectional views of 3-D models are commonly used, as disclosed, for example, in U.S. Pat. No. 7,123,767 to Jones et al.

Horizontal projections are also used in conventional practice. Starting from a three dimension dental arch model, U.S. Pat. No. 6,726,478 to Isiderio et al. describes a method comprising the steps of generating some number of horizontal projections of virtual teeth and jaws, superimposing upper and lower jaws on the same display, and aligning both jaws using displayed bite and contact point information.

One difficulty with a number of these earlier solutions for display of dental arch structures and occlusion relates to how this information is presented relative to the orientation of the dental arches as viewed by the dentist. Displayed information often does not match the view orientation. Instead, arches are consistently displayed with the same orientation, regardless of whether the mandibular jaw or maxillary jaw is of interest. For example, the incisors are consistently represented at the top of the screen, even where the dentist would prefer the opposite orientation, with incisors and arch suitably rotated, based on the perspective used in examination. There are clear advantages to display of the dental arches in an orientation that corresponds to the view angle of the practitioner. In addition, it can be beneficial to display the occlusion arrangement in which both upper and lower arches appear, while clearly differentiating the maxillary from mandibular structures on the display, at suitable orientation.

Referring back to FIG. 1A, a cutting plane adjustment step S130 enables the dental practitioner to select and adjust the viewing plane of the virtual model formed in step S120 and displays the dental arches with an orientation and display treatment that correspond to the viewing plane adjustment.

Figure 3:
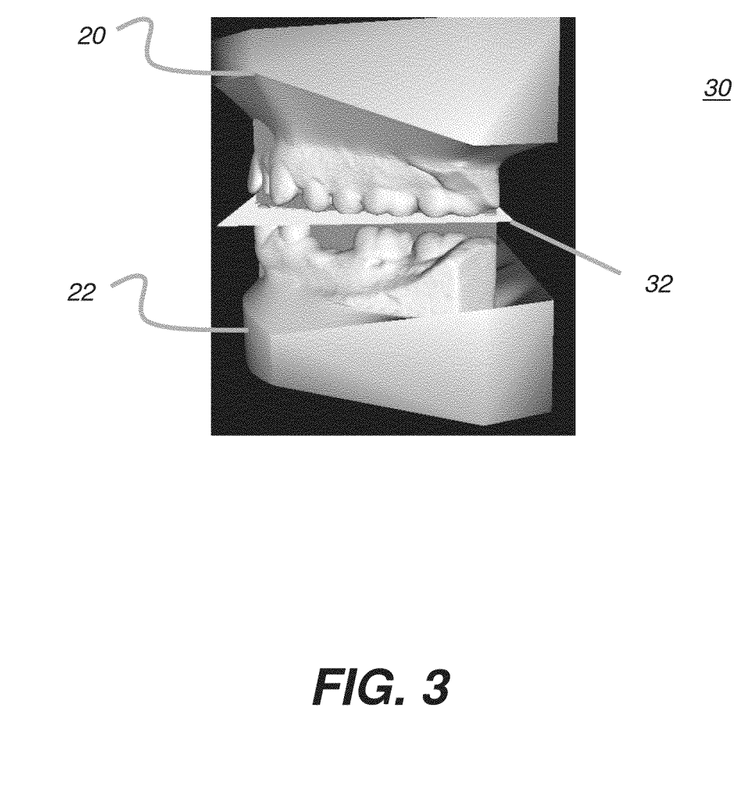
FIG. 3 is a perspective view showing occlusion and showing a cutting plane in one position.

The term "cutting plane" is used in the present disclosure to indicate the axial reference plane that extends through the virtual model at a designated height and is generated and used for providing cross-sectional information about the maxillary and mandibular arches and their corresponding occlusion. The perspective view of FIG. 3 shows a virtual model 30 with maxillary arch 20 and mandibular arch 22 in occlusion. A cutting plane 32, optionally visible and positionable by the viewer as described subsequently, then shows either a cross-sectional 2-dimensional (2-D) view of the tooth arrangement for each arch at the cutting plane or the corresponding image slice as part of a projection view from the virtual model. The cutting plane 32 is generally an axial plane, as this term is used in the 3-D imaging arts. With a projection image or volume image, the cutting plane corresponds to image slices that extend parallel to the cutting plane. Incremental adjustment of the cutting plane allows the viewer to page through successive slices of the volume image in a generally vertical direction, based on the reference view of FIG. 3. Alternately, a scrolling device that indicates a relative height dimension or other adjustable element for specifying and adjusting the relative position of a cutting plane can be used. Cutting plane 32 can be parallel, or generally parallel to an occlusal or bite plane, but need not have such a parallel arrangement. According to an embodiment of the present invention, the operator can adjust the angle of cutting plane 32 so that it achieves the most useful cross-sectional representation.

In a display step S140 of FIG. 1A, the system displays the occlusion image in either the maxillary view, with the arch open downwards, or the mandibular view, with the arch open upwards.

Figure 4A:
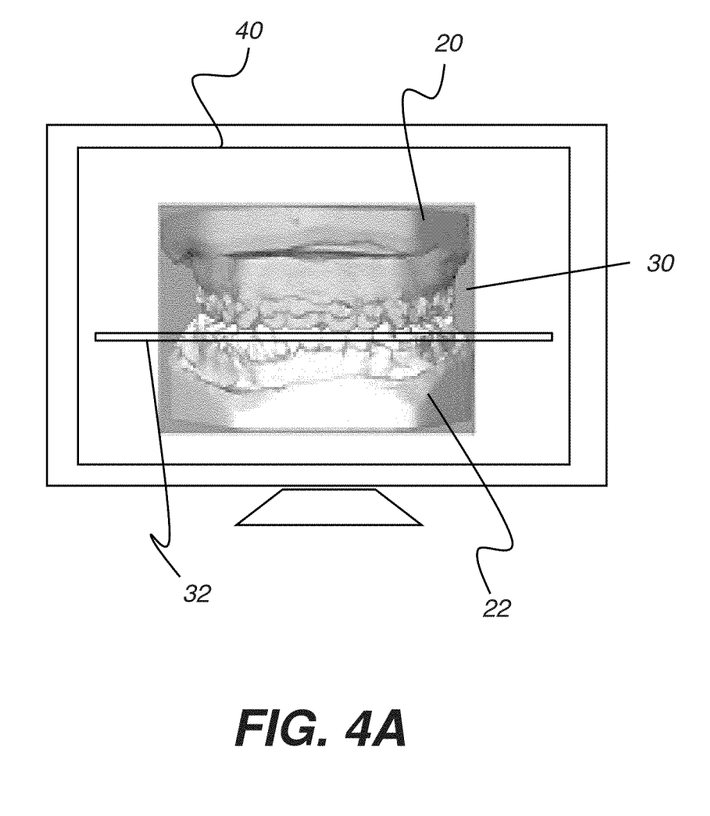
FIG. 4A shows an operator interface that shows a virtual model of maxillary and mandibular arches along with a movable cutting plane.

FIG. 4A shows a user interface display monitor 40 showing virtual model 30 with cutting plane 32 positioned by the operator. The operator can position cutting plane 32 using a computer mouse or other utility, or using keyboard entry or commands or using audible commands, for example. At this cutting plane 32 position, the mandibular arch 22 is predominant, with some smaller portion of the maxillary arch. With cutting plane 32 at this setting, the corresponding display of the dental arch has an orientation with the arch open upwards (incisors toward the bottom of the display), as shown in the cross-sectional view of FIG. 4B. Cross-sections of the corresponding teeth are shown in this embodiment; an alternate view would present the teeth as they would appear in a projection view, at the image slice corresponding to the cutting plane position. Teeth 44a from the predominant mandibular arch appear in solid outline, with the tooth outline as it intersects the cutting plane. Teeth 44b from the maxillary arch appear in dashed outline. It can be appreciated that other methods for highlighting and visually differentiating the cross sectional areas according to their corresponding jaw structure can be used. The display representation is controlled by software that executes on the computer or other processor that controls the display, as described previously with reference to FIG. 1C.

Alternative utilities can be used to re-position the cutting plane that sets the height dimension of the cross-section of the dental arches. FIG. 4C shows an adjustable scrolling element 50 that displays on display monitor 40 and is used to adjust the relative level of the plane of intersection for dental arches 20 and 22. Scrolling element 50 may be adjusted using a touch screen interface or using a mouse or other pointer, for example. Alternately, a typed keyboard entry may be used to set a height value for cross section. FIG. 4C also shows an optional control 52 for adjusting the angle of the cutting plane, allowing the operator some adjustment of the forward or backward tilt of cutting plane 32. Another optional control 54 provides a manual override of the switching of views, allowing the operator to toggle between view orientations for any position of the cutting plane 32.

Figure 4B:
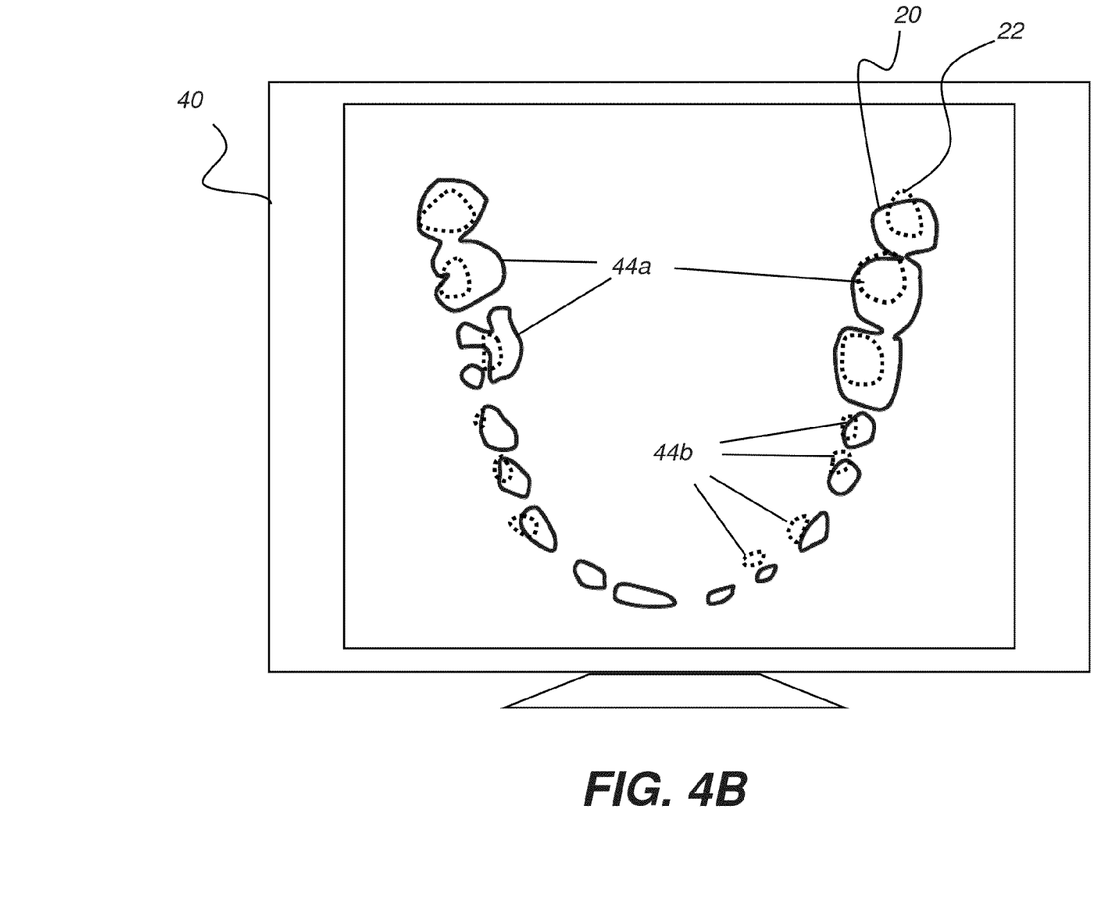
FIG. 4B is a displayed cross-sectional view showing the mandibular arch and occlusion at one position of the cutting plane.
Figure 4C:
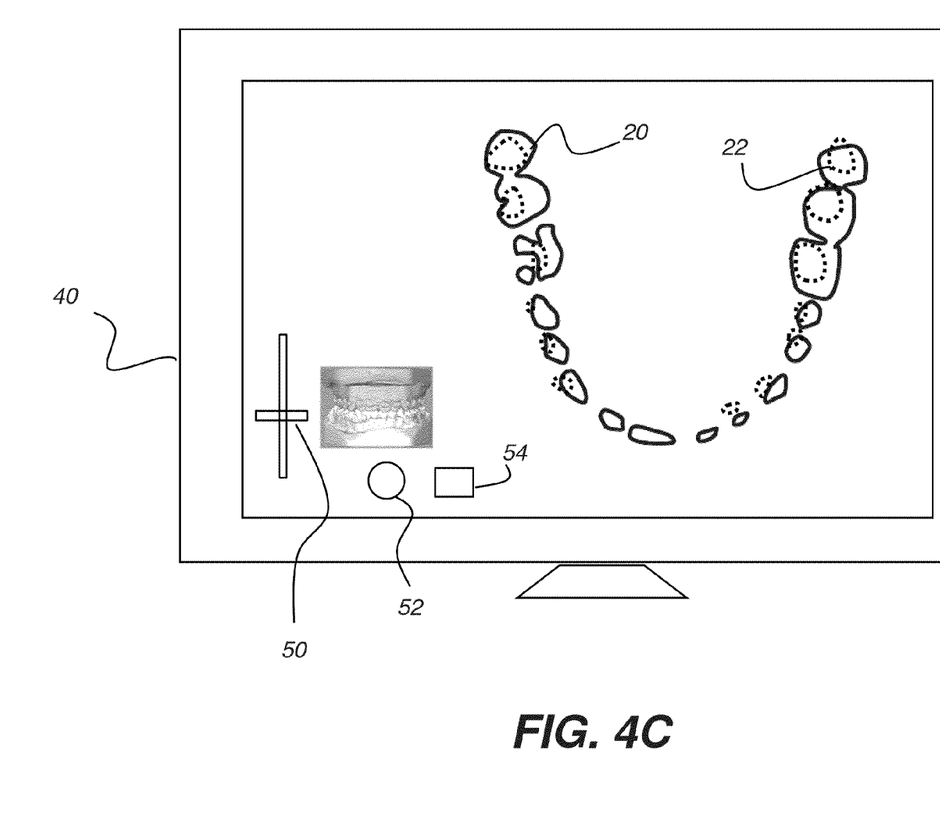
FIG. 4C shows an operator interface for adjusting the position of the cutting plane and displaying results.
Figure 5A:
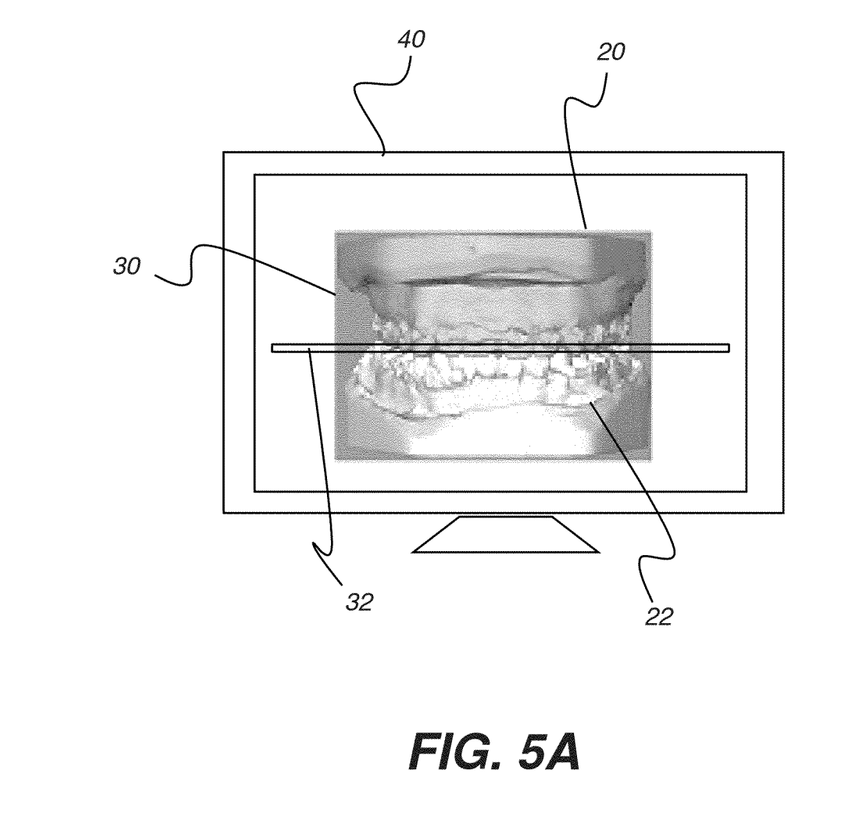
FIG. 5A shows an operator interface that shows a virtual model of maxillary and mandibular arches, with a movable cutting plane at a different position.
Figure 5B:
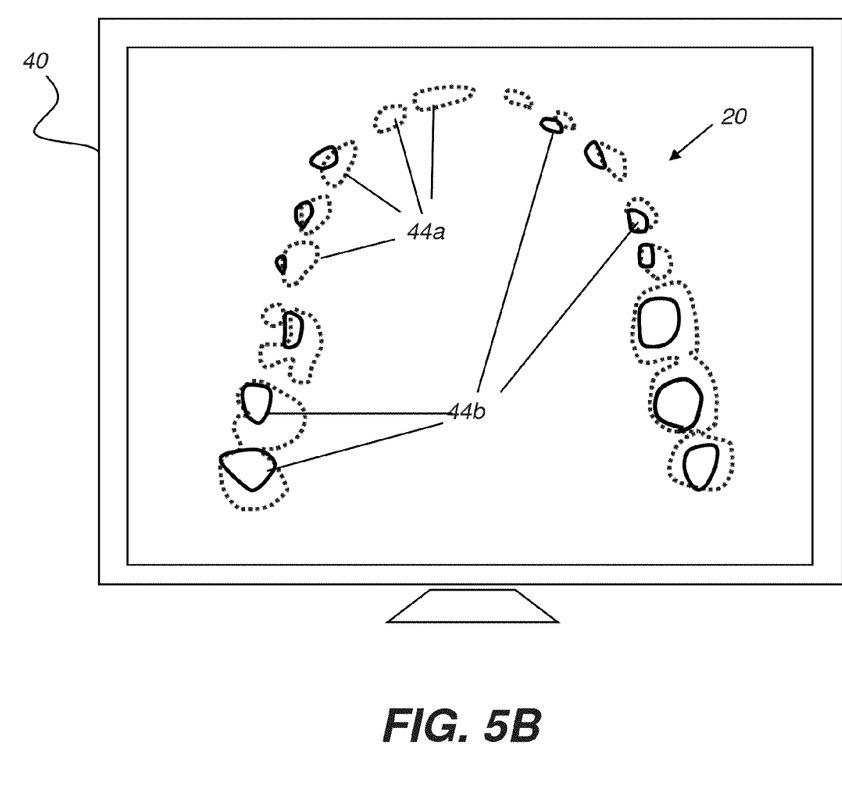
FIG. 5B is a displayed cross-sectional view showing the maxillary arch and occlusion at one position of the cutting plane.

FIG. 5A shows user interface display monitor 40 showing virtual model 30 with cutting plane 32 positioned by the operator at a different height than was shown in the examples of FIGS. 4A-4C. At this cutting plane 32 position, the maxillary arch 22 is predominant, with some smaller portion of the mandibular arch. With cutting plane 32 at this setting, the corresponding display of the dental arch has an orientation with the arch open downwards, as shown in the cross-sectional view of FIG. 5B. Cross-sections of the corresponding teeth are shown in this embodiment; an alternate view would present the teeth as they would appear in a projection view, at the image slice corresponding to the cutting plane position. Teeth 44*b* from the predominant maxillary arch appear in solid outline, with the tooth outline as it intersects the cutting plane. Teeth 44*a* from the mandibular arch appear in dashed outline.

Using the arrangement shown in FIGS. 4A-5B, the operator can conveniently switch between maxillary and mandibular views of the corresponding arches simply by shifting the relative position of cutting plane 32. In addition, the cross-sectional area of each intersected arch at the current position of the cutting plane also displays. According to an embodiment of the present invention, different treatment is used to highlight the predominant arch, such as using solid lines, using color, shading, or other display treatment.

Determining which arch is predominant, and which view is therefore appropriate, can be determined by the computer system executing programmed logic in a number of ways. According to an embodiment of the present invention, the proportional area of each set of teeth in the cross section is used to determine whether the mandibular or maxillary set has the highest surface area and should be considered to be predominant.

The software that determines the predominant arch and, consequently, the displayed upwards or downwards orientation, provides a number of features and options. The software determines which arch is predominant using proportional area, external dimensions, or other quantification. Optionally, an operator instruction is used for this purpose. As the operator adjusts the position of cutting plane 32, this calculation is repeated and the corresponding display updated accordingly. As the criterion for determining the predominant arch reaches a transition, such that the predominant arch is about to switch from the maxillary to mandibular, for example, the software optionally alerts the operator, such as by highlighting the imminent change on the display by blinking the control or providing some other indicator or message. With respect to controls shown in FIG. 4C, for example, this allows the operator to override an impending change in the view orientation, with the arch open upwards or downwards according to the predominant arch.

Under some conditions, it may be difficult for the software to determine which arch is predominant for a particular cutting plane position, particularly at or near a transition. For example, the relative proportion of maxillary and mandibular features may be evenly divided. In such a case, default behavior is to maintain the previous arch orientation until a clear determination can be made. This behavior is provided in moving from either direction through a transition point, to allow better visibility from both directions at the bite plane, for example. According to an alternate embodiment of the present invention, a beep or other audible tone is emitted as the cutting plane is moved through a transition point.

It is recognized that there can be conditions under which the default operations of the display are less suitable for the practitioner than is manual control of how the features of the maxillary and mandibular arches display. There can also be conditions under which it is useful to adjust how and at what point transitions occur, what upwards/downwards arch orientation is provided, and other system behavior. This can be the result, for example, of considerable differences between patients, or between practitioner preferences, or of special conditions in a particular case. Embodiments of the present invention allow the operator to have a measure of freedom in determining how the system behaves, including providing overrides or manual controls or settings for the display. As described with reference to FIG. 4C, operator override is provided, such as by a keyboard command or using a touch-screen or audible command, in order to invert the representation according to the needs of the practitioner.

The present invention is described as a method. However, in another preferred embodiment, the present invention comprises a computer program product for medical applications in accordance with the method described. In describing the present invention, it should be apparent that the computer program of the present invention can be utilized by any well-known computer system, such as a personal computer, such as a laptop or workstation or a microprocessor or other dedicated processor or programmable logic device, including networked computers or devices. However, many other types of computer systems can be used to execute the computer program of the present invention.

Consistent with an embodiment of the present invention, a computer executes a program with stored instructions that perform on image data accessed from an electronic memory. The computer program for performing the method of the present invention may be stored in a computer readable storage medium. This medium may comprise, for example; magnetic storage media such as a magnetic disk (such as a hard drive) or magnetic tape or other portable type of magnetic disk; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected over a network. Those skilled in the art will readily recognize that the equivalent of such a computer program product may also be constructed in hardware.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

It should be noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types. Computer-accessible memory of various types is provided on different components throughout the system for storing, processing, transferring, and displaying data, and for other functions.

The subject matter of the present invention relates to digital image processing, which is understood to mean technologies that digitally process a digital image to recognize and thereby assign useful meaning to human understandable objects, attributes or conditions, and then to utilize the results obtained in the further processing of the digital image.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for displaying teeth of a patient, the method comprising:
   generating a three-dimensional model of the patient's teeth;
   displaying the generated three-dimensional model with an occlusal orientation;
   displaying an image showing a cross-sectional view of the teeth according to a position of a cutting plane extending through the three-dimensional model with the occlusal orientation, where the cutting plane is used to indicate the axial reference plane that extends through the three-dimensional model with the occlusal orientation at a designated height and is generated and used to provide cross-sectional views of the maxillary and mandibular arches and their corresponding occlusion at the designated height; and
   adjusting the relative position of the cutting plane according to an operator instruction, wherein an orientation of the displayed cross-sectional view is directly determined by the position of the cutting plane, where the orientation of the displayed cross-sectional view is a maxillary view or a mandibular view,
   where when the cutting plane is moved to change and be predominantly in the maxillary arch then the display of the cross-sectional view automatically changes so the incisors appear at the top of the display, and where when the cutting plane is moved to change and be predominantly in the mandibular arch the display of the cross-sectional view automatically changes so the incisors appear at the bottom of the display.

2. The method of claim 1 wherein generating the three-dimensional model of the patient's teeth comprises obtaining one or more casts or impressions of the patient's maxillary and mandibular arches and digitizing the one or more casts or impressions.

3. The method of claim 1 wherein generating the three-dimensional model of the patient's teeth comprises scanning the patient's teeth using an intra-oral camera.

4. The method of claim 1 wherein generating the three-dimensional model of the patient's teeth comprises using x-ray data from a cast or impression of the patient's mouth.

5. The method of claim 1 wherein displaying the image comprises displaying a projection image.

6. The method of claim 1 wherein the maxillary view orientation and the mandibular view orientation of the displayed cross-sectional view depends on the proportional area of teeth in the cross-sectional view from the maxillary and mandibular arches.

7. The method of claim 1 further comprising changing the maxillary view orientation and the mandibular view orientation of the cross-sectional view according to an operator instruction that changes the position of the cutting plane.

8. The method of claim 7 wherein the operator instruction is entered using a computer mouse or other pointer.

9. The method of claim 7 wherein the operator instruction is an audible command.

10. The method of claim 1 wherein the incisors appear at the top of the display when the cutting plane is predominantly through the maxillary arch, wherein the incisors appear at the bottom of the display when the cutting plane is predominantly through the mandibular arch.

11. The method of claim 1 wherein the displayed cross-sectional image differentiates teeth of the upper jaw from teeth of the lower jaw.

12. The method of claim 1 wherein the operator instruction for adjusting the position of the cutting plane is entered using a display monitor.

13. The method of claim 1 wherein adjusting the relative position of the cutting plane comprises changing the angle of the cutting plane relative to the three-dimensional model.

14. A method for display of teeth of a patient, the method comprising:
   generating a three-dimensional model of the patient's teeth by obtaining one or more casts or impressions of the patient's maxillary and mandibular arches and digitizing the one or more casts or impressions;
   displaying the generated three-dimensional model with an occlusal orientation and generating an axial cutting plane at a position extending across one or both of the maxillary and mandibular arches, where the axial cutting plane is used to indicate the axial reference plane that extends through the three-dimensional model with the occlusal orientation at a designated height and is generated and used to provide cross-sectional views of the maxillary and mandibular arches and their corresponding occlusion at the designated height; and
   displaying an image showing a cross-sectional view of the teeth according to the position of the cutting plane, wherein the orientation of the displayed cross-sectional view is determined by the position of the cutting plane, where the orientation of the displayed cross-sectional view is a maxillary view where a displayed dental arch opens upward when the cutting plane is predominantly through the maxilliary arch or a mandibular view where the displayed dental arch opens downward when the cutting plane is predominantly through the mandibular arch, switches
   wherein when the axial cutting plane is switched to be predominantly in the maxillary arch then the display of the cross-sectional view automatically switches to the maxillary view, and wherein when the axial cutting plane is switched to be predominantly in the mandibular arch then the display of the cross-sectional view automatically switches to the mandibular view.

15. The method of claim 14 further comprising changing the maxillary view orientation and the mandibular view orientation of the cross-sectional view according to an operator instruction that changes the position of the cutting plane.

16. The method of claim 15 wherein the operator instruction is entered using a computer mouse or other pointer.

17. The method of claim 15 wherein the operator instruction is an audible command.

18. A non-transitory computer readable medium including computer software program for displaying a three-dimensional model of teeth of a patient from one or more scanned impressions, such that when the software program is executed on a computer, it causes the computer to provide the steps of:
generating the three-dimensional model of the patient's teeth by obtaining one or more casts or impressions of the patient's maxillary and mandibular arches and digitizing the one or more casts or impressions;
displaying the generated three-dimensional model with an occlusal orientation and generating an axial cutting plane at a position extending across one or both of the maxillary and mandibular arches, where the cutting plane is used to indicate the axial reference plane that extends through the three-dimensional model with an occlusal orientation at a designated height and is generated and used to provide cross-sectional views of the maxillary and mandibular arches and their corresponding occlusion at the designated height; and
displaying an image showing a cross-sectional view of the teeth according to the position of the cutting plane, wherein the orientation of the displayed cross-sectional view is directly determined by the position of the cutting plane, where the orientation of the displayed cross-sectional view is a maxillary view or a mandibular view,
wherein when the cutting plane is moved to be predominantly in the maxillary arch then the display of the cross-sectional view automatically changes to the maxillary view so the incisors appear at the top of the display, and wherein when the cutting plane is moved to be predominantly in the mandibular arch the display of the cross-sectional view automatically changes to the mandibular view so the incisors appear at the bottom of the display.

19. The computer software program of claim 18 further comprising stored instructions that provide an operator override for changing the orientation of the displayed cross-sectional view regardless of the cutting plane position.

20. An imaging system for displaying a virtual model of the teeth of a patient, comprising:
a device to store data of the patient's teeth;
a computer in signal communication with the device and configured to perform image processing for reconstruction of a virtual model from the obtained data of the patient's teeth;
a display in signal communication with the computer and shows results of the image processing; and
an operator interface that enables entry of operator instructions related to the display of the virtual model, the operator interface to include controls to movably position a cutting plane at a position extending across one or both of a maxillary arch and a mandibular arch of the virtual model in an occlusal orientation, where the cutting plane is used to indicate the axial reference plane that extends through the virtual model in the occlusal orientation at a designated height and is generated and used to provide cross-sectional views of the maxillary and mandibular arches and their corresponding occlusion at the designated height, and
where the display shows an image showing a cross-sectional view of the teeth according to the position of the cutting plane, wherein the position of the cutting plane switches between being predominantly in one of the maxillary arch and the mandibular arch of the virtual model in the occlusal orientation,
where when the cutting plane is moved to be predominantly in the maxillary arch then the display of the cross-sectional view directly changes to a maxillary view so the incisors appear at the top of the display, and where when the cutting plane is moved to be predominantly in the mandibular arch the display of the cross-sectional view directly changes to a mandibular view so the incisors appear at the bottom of the display.

* * * * *